(12) United States Patent
Babbar et al.

(10) Patent No.: US 8,332,926 B2
(45) Date of Patent: Dec. 11, 2012

(54) EFFICIENT MODIFICATION OF PACKET FILTERS IN A WIRELESS COMMUNICATION NETWORK

(75) Inventors: Uppinder Singh Babbar, San Diego, CA (US); Rashmi Char, San Diego, CA (US); Senthil Viswanathan, San Diego, CA (US); Srinivas Reddy Mudireddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1540 days.

(21) Appl. No.: 11/433,335

(22) Filed: May 12, 2006

(65) Prior Publication Data

US 2007/0266430 A1 Nov. 15, 2007

(51) Int. Cl.
*G06F 9/00* (2006.01)

(52) U.S. Cl. .......................................................... 726/13

(58) Field of Classification Search ................... 709/220, 709/223–227, 231, 242, 246, 249; 370/229–231, 370/235, 328, 352, 356, 389, 349, 401
See application file for complete search history.

(56) References Cited

U.S. PATENT DOCUMENTS

| | | | |
|---|---|---|---|
| 5,960,113 A | 9/1999 | Even et al. | |
| 2003/0039259 A1* | 2/2003 | Madour | ........................ 370/401 |
| 2004/0205247 A1 | 10/2004 | Ahn | |

FOREIGN PATENT DOCUMENTS

| | | |
|---|---|---|
| CN | 1531287 A | 9/2004 |
| JP | 5265756 A | 10/1993 |
| JP | 8123636 A | 5/1996 |
| JP | 9179692 A | 7/1997 |
| JP | 2004260818 | 9/2004 |
| JP | 2006500844 | 1/2006 |
| JP | 2007501578 | 1/2007 |
| WO | 9840987 | 9/1998 |
| WO | WO2004030309 A2 | 4/2004 |
| WO | 2005064890 | 7/2005 |

OTHER PUBLICATIONS

3GPP TS 24.008 V6.10.0: "Mobile radio interface layer 3 specification" ETSI, Sep. 2005, pp. 303-316, XP002459107.

(Continued)

*Primary Examiner* — Brandon Hoffman
(74) *Attorney, Agent, or Firm* — Kevin T. Cheatham

(57) ABSTRACT

Techniques for modifying packet filters in a wireless communication network are described. In one scheme, packet filters may be performed with multiple operations, if needed. The operation(s) to be performed and the order of performing the operation(s) may be dependent on the number of existing packet filters to be replaced (N) and the number of new packet filters (M). If N=M, then N packet filters in a traffic filter template may be replaced with a single operation. If N>M, then M packet filters in the traffic filter template may be replaced first, and N–M packet filters may be deleted from the traffic filter template next. If N<M, then M–N new packet filters may be added to the traffic filter template first, and N packet filters in the traffic filter template may be replaced next. In another scheme, packet filters are modified with a single operation using dummy packet filters, if needed.

20 Claims, 5 Drawing Sheets

OTHER PUBLICATIONS

Elmasri R. et al.: "Fundamentals of Database Systems—Passage" Fundamentals of Database Systems, XX, XX, 1994, pp. 212-215,276, XP002270865.
International Search Report—PCT/US07/068343, International Search Authority—European Patent Office—Apr. 21, 2008.
Written Opinion—PCT/US07/068343, International Search Authority—European Patent Office—Apr. 21, 2008.
Translation of Office Action in Chinese application 200780017052.8 corresponding to U.S. Appl. No. 11/433,335, citing CN1531287 and WO05064890.Dated Feb. 14, 2011.
Keiichi Yamachika, "Windows Server 2003, Domain Restructuring Technique, Basic Edition, Changing a Domain with Minimum Waste of Time and Effort," Windows Server World, IDG Japan, Inc., Oct. 1, 2003, vol. 8, No. 10, pp. 200-201.

* cited by examiner

EFFICIENT MODIFICATION OF PACKET FILTERS IN A WIRELESS COMMUNICATION NETWORK

BACKGROUND

I. Field

The present disclosure relates generally to communication, and more specifically to techniques for modifying packet filters.

II. Background

Wireless communication networks are widely deployed to provide various communication services such as voice, packet data, and so on. Examples of such wireless networks include Code Division Multiple Access (CDMA) networks, Time Division Multiple Access (TDMA) networks, Frequency Division Multiple Access (FDMA) networks, and Orthogonal FDMA (OFDMA) networks.

A user may utilize a wireless device (e.g., a cellular phone) to obtain various communication services from a wireless network. Each service may be satisfactorily provided to the user by ensuring that a specified quality of service (QoS) is achieved for that service. QoS may be quantified by different parameters for different services. For example, a voice service may require a relatively stringent delay and a certain minimum guaranteed data rate whereas a packet data service may require a certain target packet error rate.

The wireless device may exchange one or more traffic flows with the wireless network for the desired service(s). The QoS for each traffic flow may be defined by a set of QoS parameters. Different levels of QoS may be defined for different traffic flows to obtain the desired performance. Each traffic flow may also be associated with a set of one or more packet filters used to identify data packets belonging to that flow. Each packet filter may be formed by one or more filter parameters containing one or more fields of a network/transport layer header and/or one or more fields of a higher layer header. The packet filters may be used to segregate data packets into appropriate traffic flows so that each flow can be sent at the QoS level specified for that flow. A traffic flow may also have multiple subflows. In this case, a set of QoS parameters and a set of packet filters may be defined for each subflow to achieve the desired performance for that subflow.

It may be desirable to modify the packet filters. This may be the case, for example, if one or more subflows are added or deleted. As some examples, a new subflow may be added when a new user is added to a chat session in a voice chat application, or another streaming session may be added to an existing streaming QoS instance. New packet filters may be defined at the wireless device and sent to the wireless network. The wireless network may accept the new packet filters and may apply them to data packets sent to the wireless device. Modifying packet filters consumes valuable network resources to send the new packet filters over the air. The resource usage may be even more significant if there are restrictions on how packet filters can be modified, as described below.

There is therefore a need in the art for techniques to efficiently modify packet filters in a wireless network.

SUMMARY

Techniques for efficiently modifying packet filters in a wireless communication network are described herein. A traffic filter template (TFT) may be defined for a traffic flow or a subflow and may include one or more (T) packet filters to be applied for the flow or subflow. In one embodiment, the traffic filter template may be modified with multiple operations, if needed. The operation(s) to be performed and the order of performing the operation(s) may be dependent on the number of existing packet filters to be replaced (N) and the number of new packet filters (M), where $N \leq T$ and $M \leq T$. The operation(s) may be performed in a sequential order, starting with the operation that is most likely to fail.

If $N=M$, then N packet filters in the traffic filter template may be replaced with a single operation. If $N>M$, then M packet filters in the traffic filter template may be replaced first, and N−M packet filters may be deleted from the traffic filter template next. If $N<M$, then M−N new packet filters may be added to the traffic filter template first, and N packet filters in the traffic filter template may be replaced next. Each operation may be performed by sending a signaling message indicating the operation to be performed (e.g., replace, add, or delete) and the packet filters to be replaced, added or deleted.

In another embodiment, a traffic filter template is modified with a single operation using dummy packet filters, if needed. The traffic filter template is defined with at least one valid packet filter for filtering traffic data and at least one dummy packet filter for passing traffic data. The traffic filter template is modified by replacing a first set of packet filters in the traffic filter template with a second set of packet filters. A sufficient number of dummy packet filters is included in either the first or second set such that the two sets include equal number of (one or more) packet filters.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for modifying packet filters may be used for various wireless communication networks such as CDMA networks, TDMA networks, FDMA networks, OFDMA networks, and so on. A CDMA network may utilize a radio technology such as Wideband CDMA (W-CDMA), cdma2000, and so on. cdma2000 covers IS-95, IS-2000 and IS-856 standards. A TDMA network may utilize a radio technology such as Global System for Mobile Communications (GSM), Digital Advanced Mobile Phone System (D-AMPS), and so on. D-AMPS covers IS-136 and IS-54 standards. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, the techniques are specifically described below for a Universal Mobile Telecommunications System (UMTS) network that utilizes W-CDMA. Hence, 3GPP terminology is used in much of the description below.

Figure 1:
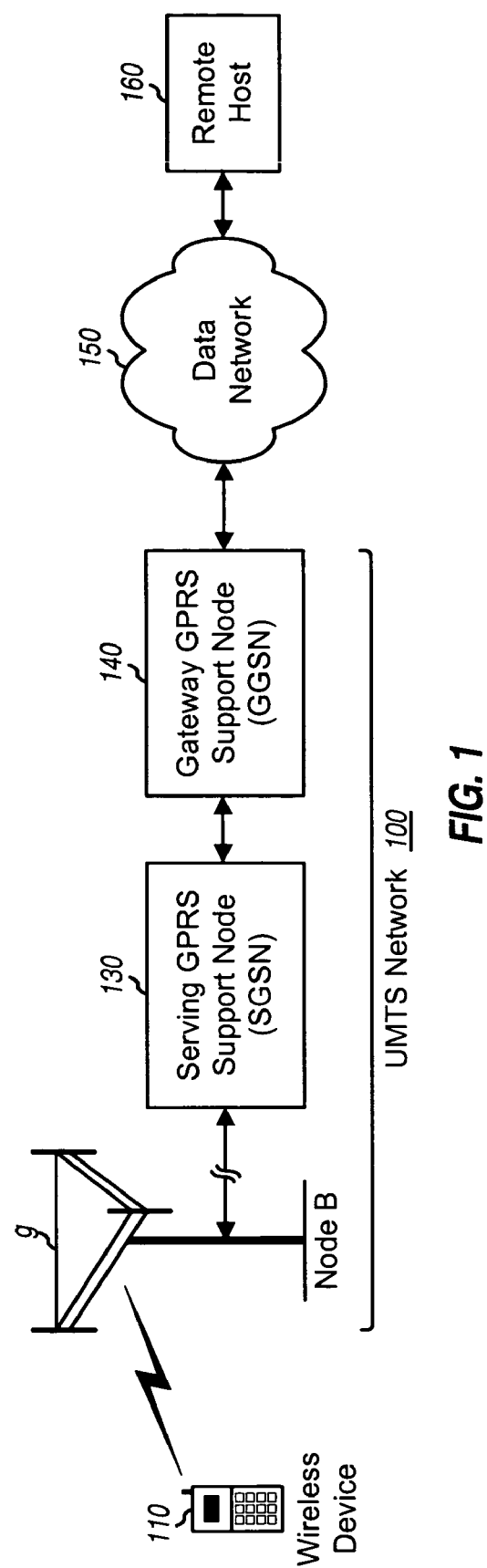
FIG. 1 shows a wireless device communicating with a wireless network.

FIG. 1 shows a UMTS network 100 that supports packet data and other services for wireless devices. For simplicity, FIG. 1 shows UMTS network 100 including one Node B 120, one Serving GPRS Support Node (SGSN) 130, and one Gateway GPRS Support Node (GGSN) 140. Node B 120 provides radio communication for wireless devices within its coverage. SGSN 130 controls the transmission of data packets between Node B 120 and GGSN 140. GGSN 140 supports data services for the wireless devices in UMTS network 100. GGSN 140 couples to a data network 150, which may be the Internet and/or some other data networks. GGSN 140 may communicate with various entities (e.g., a remote host 160) via data network 150. UMTS network 100 may be viewed as being composed of a radio network and a packet data network. The radio network includes Node B 120 and SGSN 130 and supports radio communication. The packet data network includes GGSN 140 and supports packet-switched communication between the radio network and external data networks.

A wireless network typically includes many instances of each network entity, which may also be referred to by other names. For example, in a cdma2000 network, Node B 120 is referred to as a base station, SGSN 130 is referred to as a Packet Control Function (PCF), and GGSN 140 is referred to as a Packet Data Serving Node (PDSN).

A wireless device 110 may communicate with zero, one, or multiple Node Bs at any given moment, depending on whether the wireless device is active and whether the wireless device is in handover. Wireless device 110 may also be referred to as a user equipment (UE), a mobile station (MS), a user terminal, a subscriber unit, and so on. Wireless device 110 may be a cellular phone, a personal digital assistant (PDA), a handheld device, a data card, a wireless modem, or some other device.

Figure 2:
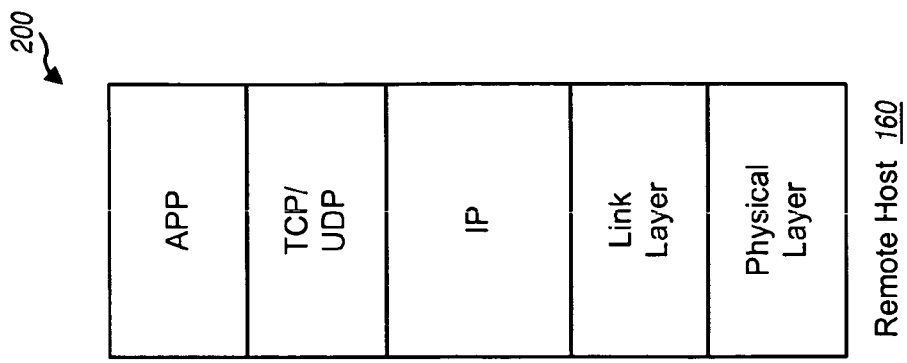
FIG. 2 shows an exemplary protocol stack for data communication.
Figure 2:
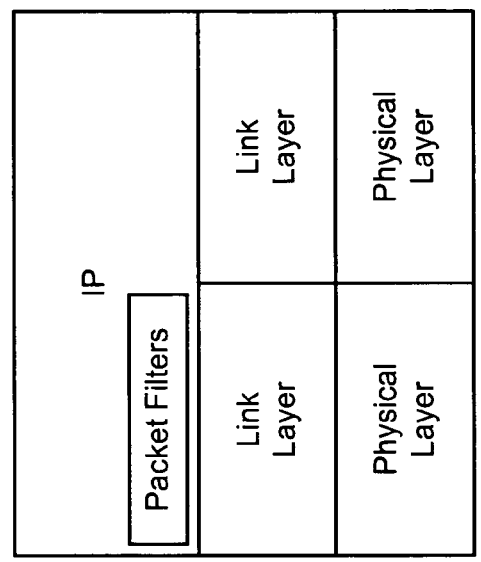
Figure 2:
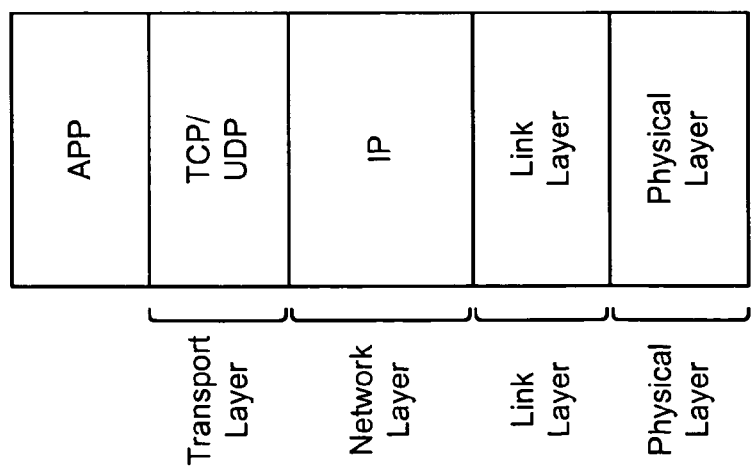

FIG. 2 shows an exemplary set of protocol stacks 200 for data communication between wireless device 110 and remote host 160 via UMTS network 100. For simplicity, FIG. 2 shows a single protocol stack for UMTS network 100. In general, each network entity in UMTS network 100 typically maintains a separate protocol stack for communication with another network entity.

Wireless device 110 communicates with remote host 160 via a protocol stack that includes a transport layer, a network layer, a link layer, and a physical layer. Applications (APP) at wireless device 110 and remote host 160 may exchange data using a data protocol stack composed of the transport layer and the network layer. The transport layer may utilize Transmission Control Protocol (TCP), User Datagram Protocol (UDP), and/or some other protocol. The network layer typically utilizes Internet Protocol (IP). Transport layer data (e.g., for TCP and/or UDP) is encapsulated in IP packets, which are exchanged between wireless device 110 and remote host 160 via UMTS network 100. Wireless device 110 also communicates with UMTS network 100 via the link layer and the physical layer, which are radio technology dependent. UMTS network 100 communicates with remote host 160 via the link layer and the physical layer, which may be different from the ones used for wireless device 110.

Figure 3:
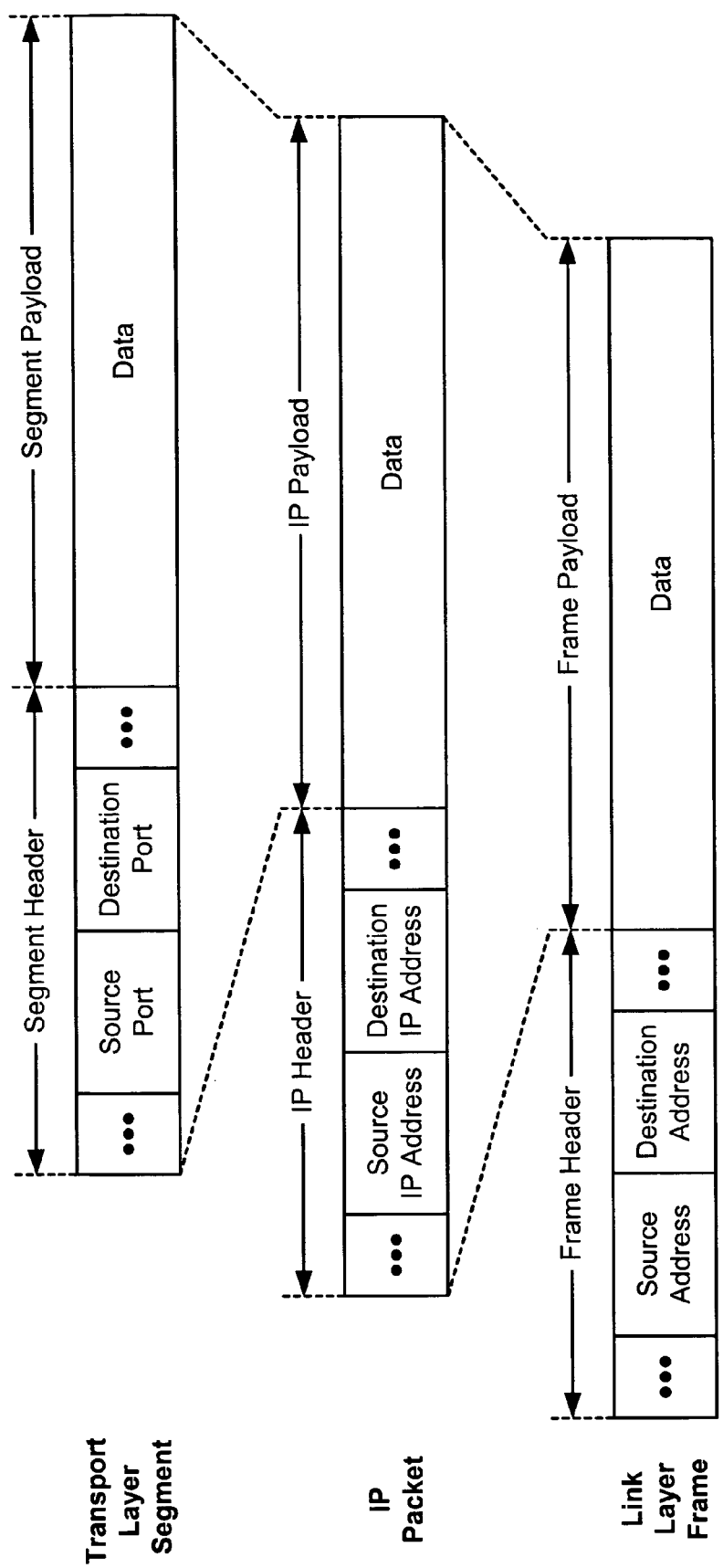
FIG. 3 shows encapsulation of data units of transport, network, and link layers.

FIG. 3 shows the formats and the encapsulation of data units at the transport, network, and link layers. At the transport layer, data is sent as transport layer segments (e.g., TCP segments), with each segment including a header and a payload. The segment header includes a source port and a destination port, where a port indicates a logical channel associated with the data in the payload. For IP at the network layer, data is sent as IP packets (or datagrams), with each IP packet including an IP header and an IP payload. The IP header includes a source IP address for a source node and a destination IP address for a destination node of an IP packet. The source and destination IP addresses may be 32-bit IP Version 4 (IPv4) addresses or 128-bit IP Version 6 (IPv6) addresses. The IP payload may carry a transport layer segment or some other data. The IP packets are encapsulated in link layer frames. Each link layer frame typically includes a header (e.g., with the source and destination addresses) and a payload for the network layer data. For example, the header of an Ethernet frame includes a source Media Access Control (MAC) address and a destination MAC address for the sender and recipient of that Ethernet frame.

Wireless device 110 may exchange one or more traffic flows with UMTS network 100 for one or more services. A traffic flow may carry one or more data flows, which may also be called subflows or IP flows. Each data flow is a stream of data packets, which are typically IP packets. Each data flow may be associated with a set of QoS parameters that specifies the desired QoS or performance for that flow. Each data flow may also be defined by (and associated with) a set of one or more packet filters that is called a traffic filter template (TFT) in 3GPP. A packet filter is formed by one or more filter parameters/components for one or more fields of the IP header and/or one or more fields of a higher layer header (e.g., a TCP or UDP header). For 3GPP, a packet filter may be defined for source IP address, destination IP address, source port, destination port, and so on. A data packet matches a packet filter if the applicable fields of that data packet conform to the filter parameters of that packet filter. QoS and packet filters for 3GPP are described in 3GPP TS 24.008 V6.10.0, entitled "Mobile radio interface Layer 3 specification; Core network protocols; Stage 3," September 2005, which is publicly available.

FIG. 2 shows the use of packet filters at UMTS network 100 for downlink traffic from UMTS network 100 to wireless device 110. On the downlink, UMTS network 100 filters data packets with packet filters to segregate these data packets into appropriate data flows, which are thereafter sent at the specified QoS to wireless device 110. On the uplink, wireless device 110 filters data packets from higher layer applications with packet filters to segregate these data packets into appropriate flows, which are thereafter sent at the specified QoS to UMTS network 100. The packet filters used at UMTS network 100 for downlink traffic are typically different from the packet filters used at wireless device 110 for uplink traffic. The packet filters for the uplink are not shown in FIG. 2 for simplicity.

For 3GPP, wireless device 110 may be provisioned with one or more Packet Data Protocol (PDP) context profiles (Primary and Secondary). Each Primary PDP context profile may define a specific data call to be established using a wireless network of a specific service provider to a specific service domain. Each Secondary PDP context profile may bear a specific QoS and may be identified by a specific TFT. Wireless device 110 may request activation of a specific PDP context to establish a desired call. Wireless device 110 may request the desired QoS and may include a TFT in the activation request sent to UMTS network 100 for a Secondary PDP context. The TFT includes packet filters to be applied by UMTS network 100 for downlink traffic to wireless device 110. Upon successful activation of the Secondary PDP context, the specified QoS and TFT are used for the call.

3GPP allows wireless device 10 to modify an existing TFT via the following operations:

Add operation—to add one or more new packet filters to the existing TFT,

Delete operation—to delete one or more packet filters from the existing TFT, and Replace operation—to replace one or more packet filters in the existing TFT.

A TFT operation may be performed by sending to the UMTS network a Modify PDP Context Request message that contains a new TFT information element (IE). The new TFT information element includes a TFT operation code that indicates the operation to be performed, e.g., add, delete, or replace. Since only one operation code is included in the TFT information element, only one TFT operation may be performed by the request message. The TFT information element also includes a list of packet filters to be added, deleted, or replaced. Each packet filter is identified by a unique packet filter identifier. The list only needs to include the identifiers of packet filters to be deleted. The list includes identifiers as well as packet filter components/parameters of packet filters to be added or replaced.

In Release 1999 of 3GPP specifications, the replace operation replaces N packet filters in the existing TFT with N new packet filters included in a Modify PDP Context Request message, where $N \geq 1$. The replace operation in Release 1999 assumes that the number of new packet filters is equal to the number of packet filters to be replaced. For example, in Release 1999, it is not possible to replace two existing packet filters with three new packet filters, or three existing packet filters with two new packet filters, without encountering errors.

In many instances, it is desirable to modify N existing packet filters with M new packet filters, where M may or may not be equal to N. The modification should consume as little over-the-air (OTA) signaling as possible to conserve radio resources. Several embodiments for efficiently modifying packet filters are described herein.

In one embodiment, a TFT is modified with multiple operations, if needed. The operation(s) to be performed and the order of performing the operation(s) may be dependent on the number of packet filters to be replaced (N) and the number of new packet filters (M). Table 1 summarizes the operation(s) to perform for three possible cases with N=M, N>M, and N<M.

TABLE 1

| Case | | Operation(s) |
|---|---|---|
| N = M | 1. | Replace N existing packet filters with N new packet filters. |
| N > M | 1. | Replace M existing packet filters with M new packet filters, and |
| | 2. | Delete N-M existing packet filters. |
| N < M | 1. | Add M-N new packet filters, and |
| | 2. | Replace N existing packet filters with N new packet filters. |

For the case with N=M, a single replace operation may performed to replace N existing packet filters in the TFT with N new packets filters. The TFT may include T total packets filters, where $T \geq N$. If N<T and only a subset of the T total packet filters is modified, then wireless device 110 may send a Modify PDP Context Request message with only the N new packet filters for the ones to be modified. Wireless device 110 does not need to send anything for the remaining T-N packet filters that have not changed, which may reduce signaling overhead.

For the case with N>M, a combination of replace and delete operations may be performed to replace N existing packet filters in the TFT with M new packet filters. Wireless device 110 may first send a Modify PDP Context Request message for the replace operation with the M new packet filters for the ones to be modified. If M<T and only a subset of the T total packet filters in the TFT is modified, then wireless device 110 may send only the new packet filters for the ones that have changed. If the replace operation is successful, then wireless device 110 may next send another Modify PDP Context Request message for the delete operation for the N-M packet filters to be deleted from the TFT.

The replace operation may fail for various reasons such as, e.g., incorrectly specified filter parameters. In an embodiment that is shown in Table 1, the replace operation is performed first since it may be more likely to fail than the delete operation. If the replace operation fails, then wireless device 110 may re-attempt the replace operation and/or abort the delete operation. If the replace operation succeeds but the delete operation fails, then wireless device 110 may revert the replace operation by doing another replace operation with the original packet filters in the TFT. The revert operation attempts to undo and nullify the impact of the original replace operation. In another embodiment, the delete operation may be performed first, followed by the replace operation.

For the case with N<M, a combination of replace and add operations may be performed to replace N existing packet filters in the TFT with M new packet filters. Wireless device 110 may first send a Modify PDP Context Request message for the add operation for M-N new packet filters to be added to the TFT. If the add operation is successful, then wireless device 110 may next send another Modify PDP Context Request message for the replace operation with N new packet filters for the ones to be modified. If M<T and only a subset of the T total packet filters in the TFT is modified, then wireless device 110 may send only the new packet filters for the ones that have changed. If $M \geq T$ and one or more of the current packet filters in the TFT are not modified, then wireless device 110 may send only the new packet filters for the ones that have changed and do not need to send anything for the ones that are not changed.

The add operation may fail for various reasons such as, insufficient resources at UMTS network 100, incorrectly specified filter parameters, and so on. In an embodiment that is shown in Table 1, the add operation is performed first since it may be more likely to fail than the replace operation. If the add operation fails, then wireless device 110 may re-attempt the add operation and/or abort the replace operation. If the add operation succeeds but the replace operation fails, then wireless device 110 may revert the previous add operation by doing a delete operation on the newly added packet filters in the TFT. In another embodiment, the replace operation may be performed first, followed by the add operation.

A flow specification defines specific parameters (e.g., for bandwidth, latency, jitter, error rate, etc., or a combination thereof) for a flow. A flow specification may be modified as part of TFT modification, e.g., due to an application requiring additional bandwidth for new subflows. Modification of the flow specification may be included in the first operation since it has higher probability of failure. If any of the TFT modification or flow modification fails in the first operation, then the second operation may be aborted. If the first operation succeeds but the second operation fails, then a revert operation may be performed to revert back to the original flow specification if it was included as part of the first operation.

Figure 4:
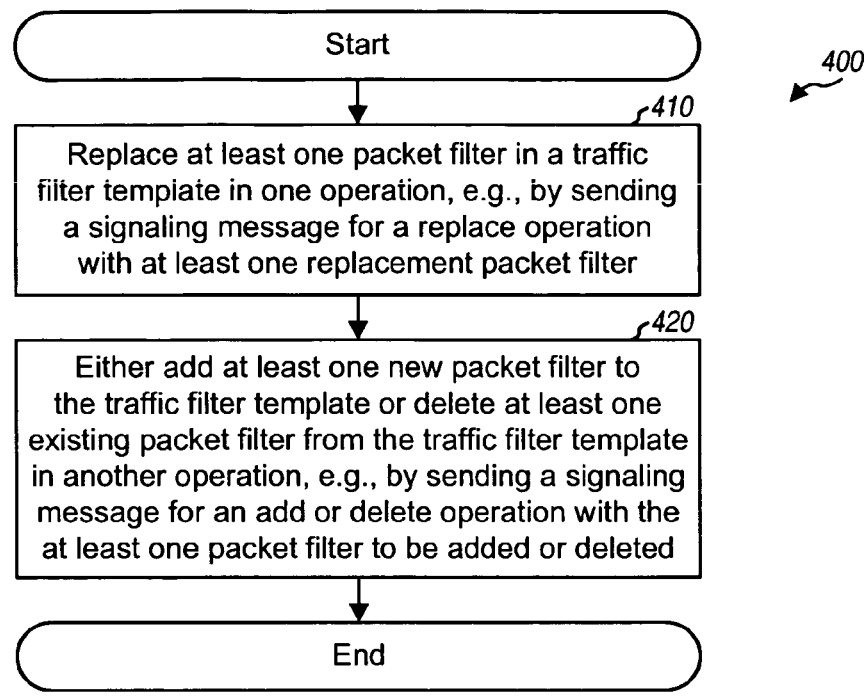
FIG. 4 shows a process for modifying packet filters with multiple operations.

FIG. 4 shows an embodiment of a process 400 for modifying packet filters with multiple operations, if needed. At least one packet filter in a traffic filter template is replaced in one operation (block 410). The traffic filter template may be any set of at least one packet filter and may also be referred to as a packet filter set or some other terminology. Either at least one new packet filter is added to the traffic filter template or at least one existing packet filter is deleted from the traffic filter template in another operation (block 420).

The operations may be performed in a sequential order, starting with the operation that is most likely to fail. If N=M, then N packet filters in the traffic filter template may be replaced with a single operation. If N>M, then the at least one packet filter in the traffic filter template may be replaced first, and the at least one existing packet filter may be deleted from the traffic filter template next. If an error is encountered in replacing the at least one packet filter in the traffic filter template, then the replace operation may be reverted by doing another replace operation with the original set of packet filters in the TFT and/or the delete operation may be skipped. If N<M, then the at least one new packet filter may be added to the traffic filter template first, and the at least one packet filter in the traffic filter template may be replaced next. The replace operation may be skipped or delayed if an error is encountered in adding the at least one new packet filter.

A signaling message (e.g., a Modify PDP Context Request message in 3GPP) may be sent for each operation. A signaling message may be sent to replace the at least one packet filter in the traffic filter template. Another signaling message may be sent to either add the at least one new packet filter or delete the at least one existing packet filter.

In another embodiment, a TFT is modified with a single operation using dummy packet filters, if needed. A certain maximum number of packet filters (X) may be allowed for a given TFT. For example, 3GPP Revision 6 allows up to 8 packet filters to be defined for a TFT. If only T packet filters are defined and installed in the TFT (e.g., by an application), where T<X, then X−T dummy packet filters may be installed in the TFT (e.g., by wireless device 110). The TFT would then include the maximum number of allowed packet filters. Thereafter, a single replace operation may be performed on as many packet filters in the TFT as needed for any modification of the packet filters.

Table 2 summarizes the operation to perform to replace N existing packet filters in the TFT with M new packet filters, where N≦X and M≦X. Table 2 shows three possible cases with N=M, N>M, and N<M.

TABLE 2

| Case | Operation |
| --- | --- |
| N = M | Replace N existing packet filters with N new packet filters. |
| N > M | Replace N existing packet filters with M new packet filters and N-M dummy filters. |
| N < M | Replace N existing packet filters and M-N dummy filters with M new packet filters. |

The embodiment in Table 2 replaces R packet filters in a single operation, where R is the larger of N and M. In another embodiment, all X packet filters in the TFT are replaced. In this embodiment, a Modify PDP Context Request message would include M new packet filters and X−M dummy packet filters.

Each dummy packet filter may be defined such that it does not match any traffic data. In essence, the dummy packet filters pass all traffic data and are merely used for modification of packet filters. Dummy packet filters may be defined in various manners. Some exemplary dummy packet filters that may be applied at UMTS network 100 for traffic data sent to wireless device 110 include:

1. Packet filter with source IP address equal to the IP address of wireless device 110,
2. Packet filter with source port or destination port equal to 0,
3. Packet filter with source or destination IP address equal to a local loopback address,
4. Packet filter with source IP address equal to a multicast or broadcast IP address, and
5. Packet filter with source or destination IP address equal to an IPv6 link-local address.

IP packets sent from UMTS network 100 to wireless device 110 should have the IP address of wireless device 110 as the destination IP address and would thus not match the first dummy packet filter given above. Since a port of 0 is undefined, no packets should have a source port of 0 or a destination port of 0 to match the second dummy packet filter given above. Packets sent with a local loopback IP address (e.g., 127.0.0.1) are used for local node loopback and should not leave an originating node. Hence, UMTS network 100 should not receive any packets with a local loopback IP address for the third dummy packet filter given above and would typically reject these packets if received. Packets with source IP addresses equal to multicast and broadcast IP addresses should be discarded by routers on the way and should not reach UMTS network 100.

IPv6 defines link-local addresses and global addresses. Link-local addresses are only valid within a given link whereas global addresses have unlimited scope. IP packets with link-local addresses for the destination IP address are not forwarded outside of the link. Since IP packets destined for wireless device 110 are typically sent using global addresses, link-local addresses may be used for the fifth dummy packet filter given above. However, if a network uses link-local addresses to send IP packets, then dummy packet filters should not be formed with link-local addresses.

Other types of dummy packet filters may also be defined based on other parameters and/or other parameter values. Since each dummy packet filter is applied at UMTS network 100, it is desirable to define dummy packet filters that are easier to apply, e.g., dummy packet filters with network layer parameters instead of higher layer parameters.

In general, a TFT may be defined with X or fewer packet filters, where X is the maximum number of packet filters allowed. The number of dummy packet filters to include in the TFT may be selected based on the expected maximum number of packet filters, which may be dependent on service, traffic class, and/or other factors. Using fewer dummy packet filters may reduce the amount of additional filtering performed by the network but may increase the likelihood of having to send additional signaling when new packet filters are added.

Figure 5:
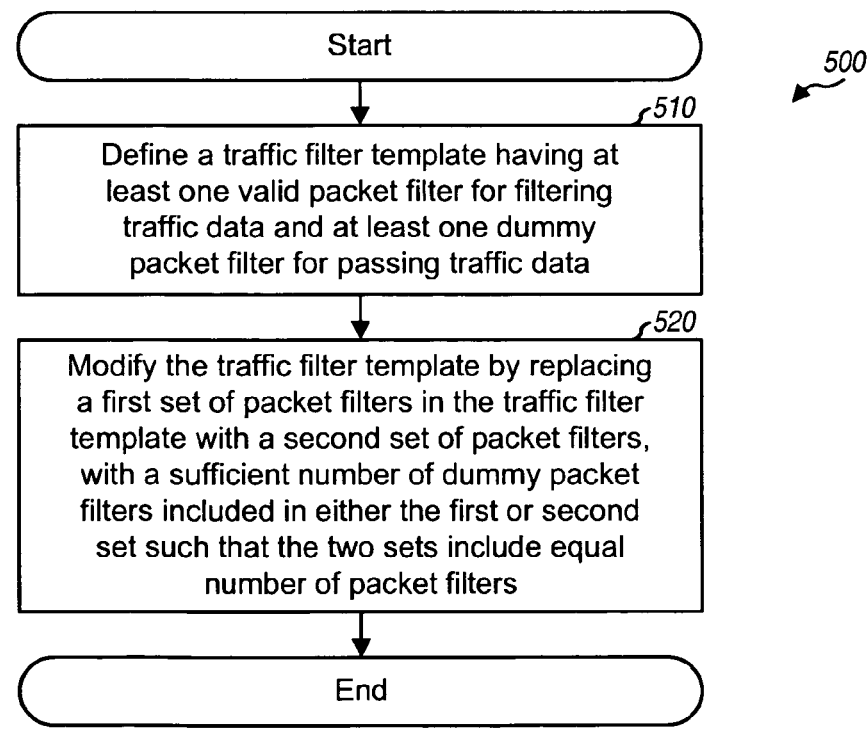
FIG. 5 shows a process for modifying packet filters using dummy packet filters.

FIG. 5 shows an embodiment of a process 500 for modifying packet filters using dummy packet filters. A traffic filter template having at least one valid packet filter and at least one dummy packet filter is defined (block 510). A valid packet filter is a packet filter that is used for filtering traffic data. A dummy packet filter is a packet filter that is used for passing (or not filtering) traffic data. The traffic filter template is modified by replacing a first set of packet filters in the traffic filter template with a second set of packet filters (block 520). A sufficient number of dummy packet filters is included in either the first set or the second set such that the first set and the second set include equal number of (one or more) packet filters.

If the first set and the second set include equal number of valid packet filters, then neither the first set nor the second set needs to include any dummy packet filters. If the first set includes more valid packet filters than the second set, then the second set may include at least one dummy packet filter to make the two sets equal. If the second set includes more valid packet filters than the first set, then the first set may include at least one dummy packet filter to make the two sets equal. A single signaling message (e.g., a Modify PDP Context Request message in 3GPP) with the second set of packet filters may be sent to replace the first set of packet filters in the traffic filter template.

Figure 6:
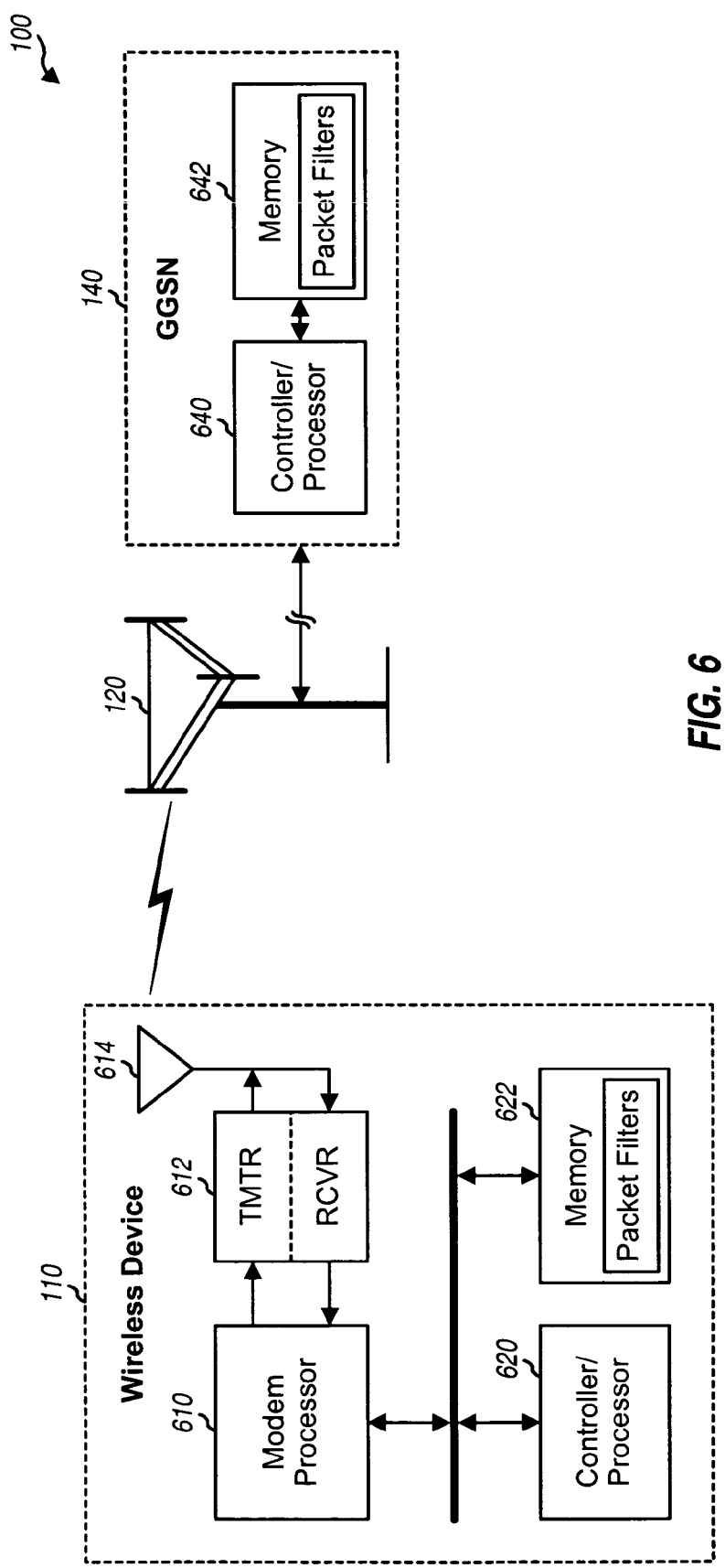
FIG. 6 shows a block diagram of the wireless device.

FIG. 6 shows a block diagram of an embodiment of wireless device 110 and GGSN 140. Wireless device 110 is capable of bidirectional communication with UMTS network 100. On the transmit path, a modem processor 610 processes (e.g., encodes and modulates) data to be sent by wireless device 110 and generates data chips. A transmitter (TMTR) 612 conditions (e.g., converts to analog, filters, amplifies, and frequency upconverts) the data chips and generates an uplink signal, which is transmitted via an antenna 614. On the receive path, downlink signals transmitted by Node B 120 and other Node Bs in UMTS network 100 are received by antenna 614. A receiver (RCVR) 612 conditions (e.g., filters, amplifies, frequency downconverts, and digitizes) the received signal from antenna 614 and provides data samples to modem processor 610 for demodulation and decoding.

A controller/processor 620 performs various functions and further controls the operation of the processing units within wireless device 110. A memory 622 stores data and program codes for wireless device 110.

Wireless device 110 may modify packet filters as described above. Memory 622 may store (1) uplink packet filters to be applied to traffic data sent from wireless device 110 to UMTS network 100 and (2) downlink packet filters to be applied to traffic data sent from UMTS network 100 to wireless device 110. Controller/processor 620 may implement process 400 in FIG. 4 and/or process 500 in FIG. 5 for modification of downlink packet filters.

GGSN 140 includes a control/processor 640 that performs various functions to support data exchanges. A memory 642 stores program codes and data for GGSN 140. For modification of packet filters, control/processor 640 may exchange signaling messages with wireless device 110, and memory 642 may store downlink packet filters for wireless device 110. Control/processor 640 may also apply the downlink packet filters on traffic data to send to wireless device 110.

For clarity, the packet filter modification techniques have been specifically described for 3GPP. These techniques may also be used for cdma2000 as well as other radio technologies.

The packet filter modification techniques described herein may be implemented by various means. For example, these techniques may be implemented in hardware, firmware, software, or a combination thereof. For a hardware implementation, the processing units used to modify packet filters may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 622 in FIG. 6) and executed by a processor (e.g., processor 620). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to perform a first operation and to conditionally perform a second operation, wherein the first operation and the second operation are selected from the group consisting of replacing at least one packet filter in a traffic filter template, adding at least one new packet filter to the traffic filter template, and deleting at least one existing packet filter from the traffic filter template, wherein the second operation is performed only if the first operation is successful, and wherein if both the first and second operations are performed, the traffic filter template includes a different number of packet filters after the first and second operations are performed than before the first and second operations are performed; and
    a memory coupled to the at least one processor.

2. The apparatus of claim 1, wherein the at least one processor is configured to perform the replace operation and either the add or delete operation in a sequential order, starting with the operation that is most likely to fail.

3. The apparatus of claim 1, wherein the at least one processor is configured to first replace the at least one packet filter in the traffic filter template and to next delete the at least one existing packet filter from the traffic filter template.

4. The apparatus of claim 3, wherein the at least one processor is configured to skip deleting the at least one existing packet filter if an error is encountered in replacing the at least one packet filter in the traffic filter template.

5. The apparatus of claim 3, wherein the at least one processor is configured to perform a replace operation with original packet filters in the traffic filter template if an error is encountered in deleting the at least one existing packet filter from the traffic filter template.

6. The apparatus of claim 3, wherein the at least one processor is configured to modify a flow specification in the replace operation, to skip the delete operation if the replace operation fails, and to perform a modify operation with the flow specification if the replace operation succeeds but the delete operation fails.

7. The apparatus of claim 1, wherein the at least one processor is configured to first add the at least one new packet filter to the traffic filter template and to next replace the at least one packet filter in the traffic filter template.

8. The apparatus of claim 7, wherein the at least one processor is configured to skip replacing the at least one packet filter in the traffic filter template if an error is encountered in adding the at least one new packet filter.

9. The apparatus of claim 7, wherein the at least one processor is configured to delete the at least one new packet filter from the traffic filter template if an error is encountered in replacing the at least one packet filter in the traffic filter template.

10. The apparatus of claim 7, wherein the at least one processor is configured to modify a flow specification in the add operation, to skip the replace operation if the add operation fails, and to perform a modify operation with the flow specification if the add operation succeeds but the delete operation fails.

11. The apparatus of claim 1, wherein the at least one processor is configured to send a signaling message to replace the at least one packet filter in the traffic filter template and to send another signaling message to either add the at least one new packet filter or delete the at least one existing packet filter.

12. A method comprising:
performing a first operation; and
conditionally performing a second operation, wherein the first operation and the second operation are selected from the group consisting of:
  replacing, by a wireless device, at least one packet filter in a traffic filter template;
  adding, by the wireless device, at least one new packet filter to the traffic filter template; and
  deleting, by the wireless device, at least one existing packet filter from the traffic filter template;
wherein the second operation is performed only if the first operation is successful, and wherein if both the first and second operations are performed, the traffic filter template includes a different number of packet filters after the first and second operations are performed than before the first and second operations are performed.

13. The method of claim 12, wherein the replacing and the either adding or deleting comprise
  first replacing the at least one packet filter in the traffic filter template, and
  next deleting the at least one existing packet filter from the traffic filter template.

14. The method of claim 12, wherein the replacing and the either adding or deleting comprise
  first adding the at least one new packet filter to the traffic filter template, and
  next replacing the at least one packet filter in the traffic filter template.

15. An apparatus comprising:
means for performing a first operation; and
means for conditionally performing a second operation, wherein the first operation and the second operation are selected from the group consisting of:
  replacing at least one packet filter in a traffic filter template;
  adding at least one new packet filter to the traffic filter template; and
  deleting at least one existing packet filter from the traffic filter template;
wherein the second operation is performed only if the first operation is successful, and wherein if both the first and second operations are performed, the traffic filter template includes a different number of packet filters after the first and second operations are performed than before the first and second operations are performed.

16. The apparatus of claim 15, wherein the means for replacing and the means for either adding or deleting comprise
  means for first replacing the at least one packet filter in the traffic filter template, and
  means for next deleting the at least one existing packet filter from the traffic filter template.

17. The apparatus of claim 15, wherein the means for replacing and the means for either adding or deleting comprise
  means for first adding the at least one new packet filter to the traffic filter template, and
  means for next replacing the at least one packet filter in the traffic filter template.

18. A non-transitory processor readable media for storing instructions operable in a wireless device to:
perform a first operation; and
conditionally perform a second operation, wherein the first operation and the second operation are selected from the group consisting of:
  replacing at least one packet filter in a traffic filter template;
  adding at least one new packet filter to the traffic filter template; and
  deleting at least one existing packet filter from the traffic filter template;
wherein the second operation is performed only if the first operation is successful, and wherein if both the first and second operations are performed, the traffic filter template includes a different number of packet filters after the first and second operations are performed than before the first and second operations are performed.

19. The processor readable media of claim 18, and for storing instructions operable to:
  first replace the at least one packet filter in the traffic filter template, and
  next delete the at least one existing packet filter from the traffic filter template.

20. The processor readable media of claim 18, and for storing instructions operable to:
  first add the at least one new packet filter to the traffic filter template, and
  next replace the at least one packet filter in the traffic filter template.

* * * * *